UNITED STATES PATENT OFFICE.

ISAAC WINSLOW, OF PHILADELPHIA, PENNSYLVANIA, ASSIGNOR TO JOHN W. JONES, OF PORTLAND, MAINE.

IMPROVED PROCESS OF PRESERVING GREEN CORN.

Specification forming part of Letters Patent No. 35,346, dated May 20, 1862.

*To all whom it may concern:*

Be it known that I, ISAAC WINSLOW, of Philadelphia, in the county of Philadelphia and State of Pennsylvania, have invented a new and useful Improvement in the Process of Preserving Green Corn; and I do hereby declare that the following is a full and exact description thereof, reference being had to the accompanying drawings, and to the letters of reference marked thereon.

My improvement in preserving green corn consists in sealing it up in cans or other suitable vessels and then boiling or steaming the same without allowing the corn to come in contact with the water or steam.

According to the common theory corn, as well as fruits, cannot be preserved in sealed cans without excluding the air. Therefore the first attempts at preserving unripened corn were made by boiling the same before sealing it up in cans. In this way the milk and other juices of the corn are more or less evaporated. If water be employed to boil the corn, the milk and juices are to a greater or less extent dissolved out. In either case the native aroma and sweet taste of the corn are destroyed, and the corn often becomes hard—like that which has been dried and afterward soaked and prepared for the table.

In order to preserve the green corn as nearly as possible in its natural state, I have invented the improved process of sealing the unripe corn (after its removal from the cob) in airtight cans and then heating the same, so as to coagulate the milk and other juices of the corn and prevent the escape of the native aroma.

In preserving green corn by my improved process, the kernels should first be removed from the cob (which may be readily accomplished by means of a curved knife invented for that purpose) and then immediately put into strong tin cans and hermetically sealed. These cans are then boiled or steamed until the corn is thoroughly cooked, which usually requires about four hours, when the cans may be slowly cooled in a warm room. Less time may answer for corn intended for a cold climate or for present use.

After many experiments I find that the small quantity of air which may be thus inclosed in the cans does not cause putrefaction or interfere in any way with the permanent preservation of the corn. Therefore the generally-received theory that air must be entirely excluded from the cans is completely overthrown by my experiments. In this way of preparing corn the air contained within the can at the time of sealing and also the vapor from the corn become more or less expanded, so as to press the heads of the can outward, and thus give the appearance of cans containing spoiled corn, from which the gaseous products of decomposition have pressed the can-heads outward. As dealers have generally a great prejudice against such expanded cans, I have sometimes adopted the plan of puncturing the sealed cans during the process of boiling or while the cans are still hot in order to relieve the internal pressure by allowing the air to escape, and then sealing up the puncture, so that in cooling the cans the pressure of the external atmosphere will spring the heads of the cans inward—like those of ordinary preserved fruit. In case the cans are punctured while hot, I prefer to make the puncture after the process of boiling has continued a short time—say about ten minutes—and then immediately seal up the puncture and continue the boiling. One advantage of puncturing the cans is that it prevents the possibility of bursting them by heat.

Corn preserved by my process is regarded by epicures as superior to that taken fresh from the field and boiled upon the cob in the usual way.

In my method of preserving green corn the aroma is not allowed to escape, and nothing can be dissolved or washed out of the corn.

It is obvious that the method of hermetically sealing green corn in cans and previous to boiling is applicable to ears of corn, though I do not recommend that practice.

I am aware that vegetable substances have been preserved by boiling or cooking them in cans hermetically sealed either before or after exposure to heat, and that fruits have been thus cooked in their own juice either with or without the addition of sugar; but in such cases the object of sealing has been the entire expulsion and exclusion of air from the cans. In my process the cans are sealed irrespective of their containing a small quantity of air with the corn, and instead of continuing the heat only half an hour (which has been supposed sufficient to boil green corn) I continue the heat several hours—usually four hours—thus thoroughly coagulating the milky juice and completely preventing putrefactive fermentation. I believe that all attempts to preserve green corn without drying the same have been unsuccessful previous to my invention.

Having thus fully described my invention, what I claim, and desire to secure by Letters Patent of the United States, is—

The above-described process of preserving Indian corn in the green state without drying the same, the corn being sealed hermetically in cans or other vessels and then exposed to heat, substantially in the manner and for the purposes set forth.

ISAAC WINSLOW.

Witnesses:
  SAMUEL C. OGLE,
  WILLIAMS OGLE.